UNITED STATES PATENT OFFICE.

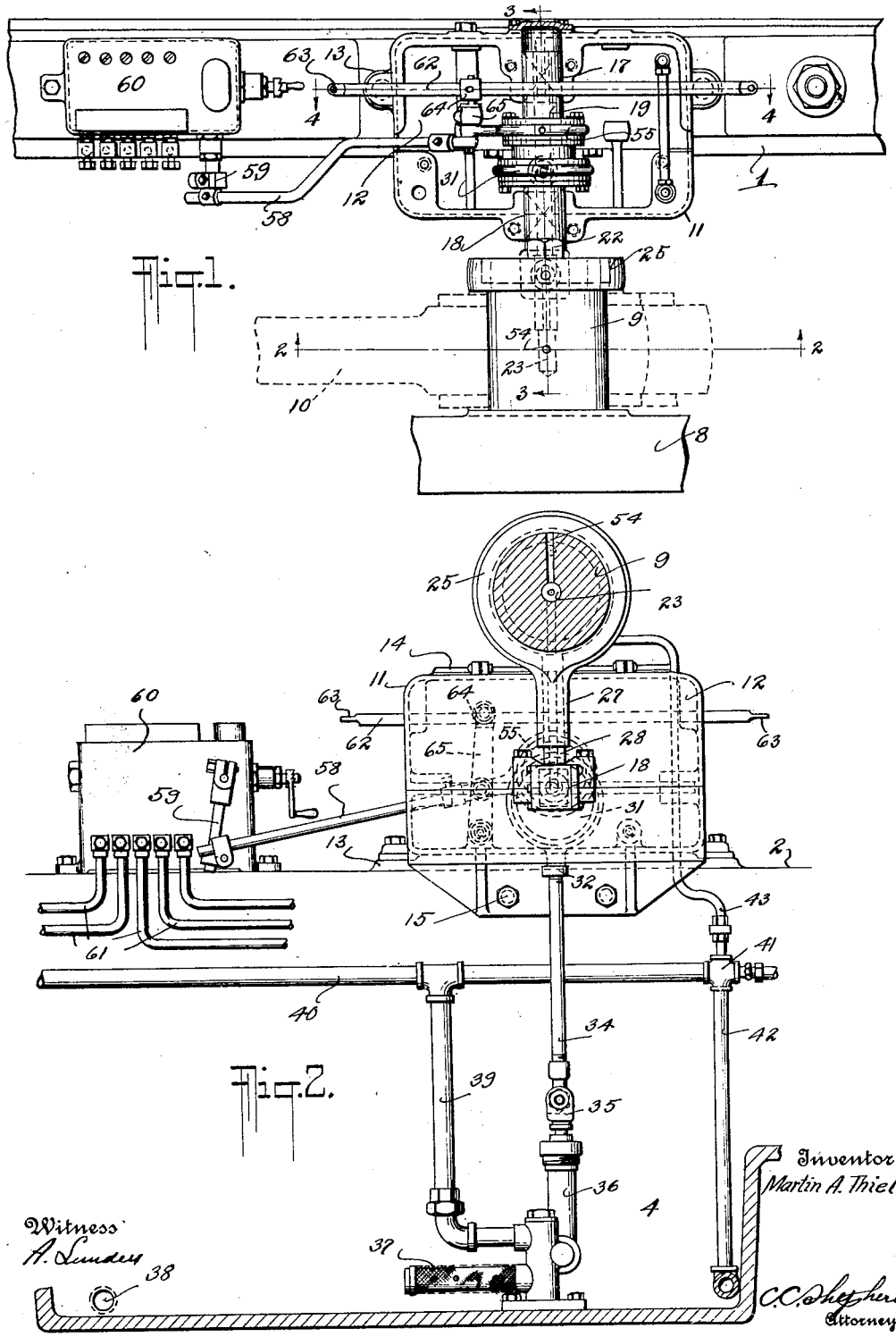

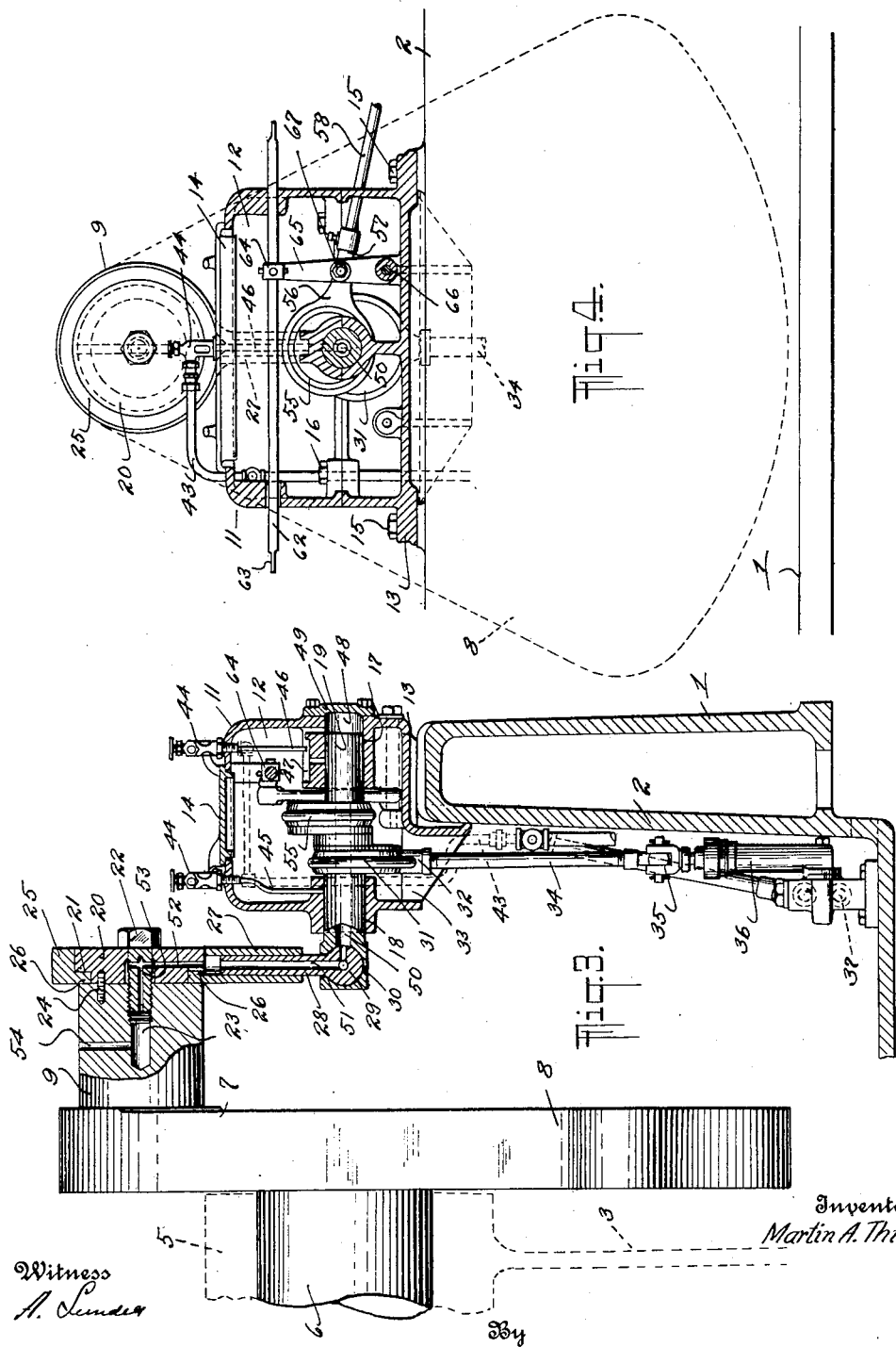

MARTIN A. THIEL, OF MOUNT VERNON, OHIO.

OIL-PUMP AND INDICATOR DEVICE FOR ENGINES.

1,371,333.     Specification of Letters Patent.     Patented Mar. 15, 1921.

Application filed February 18, 1920. Serial No. 359,576.

*To all whom it may concern:*

Be it known that I, MARTIN A. THIEL, a citizen of the United States, residing at Mount Vernon, in the county of Knox and State of Ohio, have invented certain new and useful Improvements in Oil-Pump and Indicator Devices for Engines, of which the following is a specification.

This invention relates broadly to stationary engines, and has particular reference to engines of the type wherein are embodied rotary crank structures which are employed to transfer the reciprocatory motion of engine pistons to rotary motion, and has for its object to provide an engine of this character wherein is embodied a novel grouping and correlation of hitherto separately operated engine parts into a unitary form, whereby the rotation of the crank structure will serve in a novel way to effect the operation of the lubricating mechanism of the engine in combination with indicator operating means.

The invention essentially consists in the provision of a heat engine wherein is embodied a rotary crank structure and a centralized lubricating unit, which latter is formed to embody an actuating shaft which is adapted to be driven by the rotation of the crank structure, and to provide a plurality of oil pumps, which are so located as to be actuated from the shaft of said unit, whereby a forced circulation of the lubricant to the moving parts of the engine is maintained and one in which power to effect its operation is derived from the rotary crank structure.

Another object of the invention resides in mechanism of the aforesaid character wherein the axes of rotation of the crank structure and the actuating shaft of the lubricating unit are in relative alinement, and in the provision of an improved adjustable connection between the crank structure and said shaft, said connection being so constructed as to automatically adapt itself to any irregularities or defects which may exist between the relative alinement of said rotative axes.

A further object of the invention resides in providing improved means for effecting a forced and positive flow of a lubricant from the oil pumping mechanism to the wear receiving surfaces of the crank pin of said crank structure, which consists in pumping a lubricant from the housing of said unit, in forcing said lubricant through a longitudinal passageway in its actuating shaft, and then in permitting said lubricant to flow by centrifugal force through the connection between said shaft and said crank pin so that in this manner the same will be delivered to the wear surfaces of said pin.

A still further object resides in providing means for imparting a reciprocatory motion to the indicator member, in such manner that said motion will constitute a correct reduction of the motion of the engine's piston, and to accomplish this result primarily by driving said shaft from the crank pin, and in proportioning the length of the connection between said shaft and member in direct ratio with that of the engine's connecting rod.

With these and other objects in view, as will appear as the description proceeds, the invention accordingly consists in the novel features of construction, combination of elements and arrangement of parts, hereinafter to be fully described and to have the scope thereof pointed out in the appended claims.

In the accompanying drawings forming a part of this specification, and in which similar characters of reference denote like and corresponding parts:

Figure 1 is a top plan view of the crank structure of a reciprocatory engine, and illustrating more particularly the location of the lubricating unit comprising the present invention with respect to said crank structure.

Fig. 2 is a vertical longitudinal sectional view taken through the engine on the plane indicated by the line 2—2 of Fig. 1.

Fig. 3 is a transverse vertical sectional view taken along the line 3—3 of Fig. 1, and, Fig. 4 is a vertical longitudinal sectional view taken along the line 4—4 of Fig. 1, the parts being viewed in a direction opposed to the arrangement shown in Fig. 2.

In the form of the invention disclosed in the drawings, there has been fragmentarily shown the base or bed frame 1 of a stationary engine; the frame is formed to embody spaced vertical walls 2 and 3, between which is positioned an oil basin 4. The wall 3 is provided with an extended bearing 5 in which is journaled the crank shaft 6 of a crank structure 7. This structure, in the form of the invention illustrated, consists of a fan-tail crank 8, which has one of its ends provided with the usual offset crank pin 9. A connecting rod 10, disclosed in dotted lines in Fig. 1, may be connected as usual with said pin and will then have its other end connected with the usual cross head construction (not shown) of the engine. It may be said that the cylinder and piston construction of the engine may be of any suitable form and arrangement, and inasmuch as they do not form a salient part of the present invention, it has not been deemed necessary to illustrate or describe the same.

Stationarily carried by the wall 2 of the frame 1, is what is termed for convenience in description, a lubricating unit 11, and by means of which the various functions of the present invention are carried out. This unit preferably consists of a casing 12, which is formed to embody a base section 13 and a cover section 14. The base section is rigidly secured by means of bolts 15 to the wall 2, so that the operative position of the casing will be maintained at all times throughout the operation of the engine. The housing may be bolted or otherwise secured as at 16 to the base section 13, and it will be manifest that by removing the cover section, the interior of the casing will be rendered conveniently accessible to the engineer. The sections 13 and 14 are assembled so as to provide transversely alined bearings 17 and 18, in which is journaled a transversely situated actuating shaft 19. The inner end of the latter terminates in spaced relation from the outer side wall of the casing or in other words is terminated within the outer bearing 17, while the inner end of said shaft projects entirely through the bearing 18 and is terminated at a position exterior of the casing. It will be observed upon reference to Fig. 3 that the axis of the shaft 19 and the rotatable axis of the crank structure 7 are in relative alinement, and this arrangement of parts is effected in order that the actuating shaft 19 may be driven directly from the crank structure, a feature which is particularly essential in the present invention.

In order to effect the rotation of the shaft 19, the crank pin 9 has its outer end equipped with a removable plate 20. This plate is provided with an annular recess 21 in its periphery and is retained in position by means of a threaded bolt 22, which axially enters the pin 9 and is threadedly positioned within a bore 23 formed longitudinally in said pin, a dowel pin 24 may be utilized in preventing rotative movement on the part of the plate 20. As is clearly shown in Fig. 3, the plate 20 serves to rotatably connect a collar 25 with the outer end of the crank pin, and this collar is provided with an annular rib 26 which is positioned within the recess 21, and by engaging with the plate 20, said collar will be securely held against longitudinal displacement, but will be permitted to rotate about the axis of the crank pin. In this instance the collar is provided with an inwardly projecting sleeve portion 27, in which is telescopically fitted a crank arm 28, which is carried by the inwardly projecting end of the actuating shaft 19. The inner end of the crank arm is provided with a spherical head 29, which is seated within a similarly formed socket 30 provided in the projecting end of the shaft 19. By virtue of this construction it will be observed that there is provided an adjustable driving connection between the actuating shaft of the lubricating unit and the crank structure 7. The purpose of this adjustable connection is to overcome such irregularities or variations, if any, in the relative axial positions of the shaft 6 and the shaft 19. Practice has disclosed that such irregularities however minute are constantly present and that practically it is impossible to secure complete harmony in the alinement of the two shafts, one shaft may be slightly offset in a lateral direction with respect to the other, or said shafts may be longitudinally inclined so that an angular relationship will exist. However, it will be observed that through the adjustable connection described such irregularities will have no effect upon the driving connection between the crank structure and the actuating member of the lubricating unit, hence smoothness in operation is assured, and one wherein binds and undue friction and wear is eliminated. Furthermore, the element of variation is largely eliminated between the parts in question by use of the adjustable connection.

Rotatable with the shaft 19 and positioned between the bearings 17 and 18 is an eccentric 31. This eccentric carries the usual strap construction 32, which projects downwardly through an opening 33 formed in the base section 13 of the casing. The lower end of the strap 32 is connected with a pump actuating rod 34, which extends parallel with the side walls of the bed frame, and the lower end of said rod is, in turn, connected by means of an oscillating joint 35 with the actuating stem of an oil pump 36, which latter is located within the oil basin 4 and rests upon the base of the frame 1. The construction of this pump by itself does not enter essentially into the present invention, said pump may be one of many standard designs, hence a detailed description as to its operation and construction is not deemed to be necessary. However, it may be stated that the inlet 37 of the pump is so situated as to lie within the basin 4 and to thereby receive its source of fluid from the lubricant contained within said base. If desired, the inlet 37 may be screened to exclude extraneous matter. An oil return pipe 38 enters the basin 4 and is of such formation as to insure a return flow of the lubricant of the engine to the basin. The discharge end of the pump is connected with an upwardly directed pipe 39, which leads to a lubricant manifold 40, this manifold may be employed to distribute the lubricant to the bearings and other like movable parts of the engine or to such parts that do not require a particularly fine grade quality of oil. The manifold 40 is provided with a union 41 with which is connected a branch pipe 42, the latter being utilized for the purpose of lubricating main bearings. Also connected with the union 41 is an upwardly directed pipe 43 through which oil is forced from the pump 36, and this pipe leads to sight feed valve 44 carried by the cover section 14 of the casing 12. A duct 45 leads from one of the valves 44 and enters the inner bearing 18 for the purpose of supplying the latter with the necessary amount of lubricant, while the other valve is provided with a vertical duct 46, which terminates immediately above a pocket 47 formed in the outer bearing 17. This pocket is provided with a small opening which lubricates that portion of the shaft 19 within the bearing 17, and said pocket is formed with a second opening which leads to a chamber 48 formed at the end of the shaft 19 and which is covered by means of a removable closure plate 49. Said chamber 48 is in open conjunction with a longitudinally extending bore 50 which passes through the shaft 19, and it will be evident from this that oil discharged from the pump 36 will be forced into the chamber 48 and thence through the bore 50 and into an angular port 51 provided in the crank arm 28, whereby upon the rotation of the crank structure, said lubricant will be forced out of said port by responding to centrifugal force. Oil discharged from the port 51 is transferred to the registering port 52 provided in the collar 25 and is then delivered partly to the bearing which exists between the outer end of the crank pin and the inner face of said collar. More particularly, however, the oil entering the port 52 is positively forced by the rotation of the crank structure into a longitudinal port 53 formed in the bolt 22, so that the same will be discharged into the communicating bore 23 provided in the crank pin. This latter bore is in conjunction with an angularly situated port 54 which opens directly to the wear receiving surfaces of the crank pin so that the bearing between said crank pin and the connecting rod 10 will be effectively and positively lubricated. It will be observed that by virtue of this construction the use of grease cups and other similar contrivances is effectively eliminated and that an efficient oil system has been provided for relatively small engines, a problem which has been difficult to efficiently yet economically solve.

Also, rotatable with the shaft 19 is a second eccentric 55 which carries a strap 56 which is provided with a laterally projecting portion 57. The outer end of the portion 57 is suitably connected with a link 58 which has its free end connected with the operating crank 59 with a standard type of force feed oil pump 60, which latter is rigidly carried by and positioned upon the side wall 2. Pipes 61 lead from the pump 60 and may be suitably directed to such pistons and movable parts of the engine as require a particularly high or fine grade of oil to properly lubricate the same. Thus, by the provision of the lubricating unit, common means is provided for effecting the operation of both of the pumps of the oil distributing system of a stationary engine. Moreover, the lubricating unit includes, in combination, a reciprocatory indicator member 62, which is mounted for sliding movement within bearings formed in the cover section 14, the ends of the member 62 project beyond the confines of the casing 12 and are reduced and apertured as at 63 in order that the member 62 may be connected by cables with the efficiency indicators of the engine. Said member 62 in this instance is equipped with a block 64 to which is pivotally connected the upper end of a pivoted throw arm 65. This arm is pivoted as at 66 to the bottom of the casing, and is intermediately connected as at 67 to the portion 57 of the eccentric strap 56, whereby upon the operation of the eccentric, back and forth movement will be imparted to the member 62. This motion on the part of the member 62 is a correct reduction of the motion of the engine's piston, because the shaft 19 is driven directly from the crank pin and the throw length of the strap 56 is in direct ratio with that of the engine's connecting rod.

From the foregoing description, it will be apparent that the present invention provides mechanism for efficiently carrying out the objects of the invention, and that all of the advantageous features of operation and construction above mentioned are, among others, present. By virtue of the construction described, a coöperative grouping of a hitherto large number of separately related elements is effected, and therefore efficiency and reliability in operation is enhanced and control over the various elements of the mechanism is to be readily obtained. The parts of the structure are all conveniently accessible, and adjustments and repairs when necessary may be quickly made by opening the cover section 14 which brings into convenient reach all of the inclosed parts.

I claim:

1. In mechanism of the class described, the combination with the crank structure of an engine, of a lubricating unit for said engine, comprising an actuating shaft situated to be substantially co-axial with the rotating axis of said crank structure, a self adjusting driving connection between said shaft and crank structure, said connection operating to automatically adjust itself to irregularities in relative alinement of the axial positions of said crank structure and shaft, a lubricant pump, and mechanism driven by said shaft for effecting the operation of said pump.

2. In mechanism of the class described, the combination with the bed frame of an engine, said frame including an oil basin, a crank structure journaled upon said frame, a lubricating unit including an actuating shaft, a driving connection between said crank structure and shaft whereby the latter is positively rotated by the movement of said crank structure, an oil pump situated within said basin and capable of delivering to various moving parts of said engine, and an operating element for said pump driven by said shaft.

3. In mechanism of the class described, the combination with the crank structure of an engine, of a lubricating unit for said engine, comprising an actuating shaft situated so as to be substantially co-axial with the rotative axis of said crank structure, a self adjustable driving connection between said crank structure and said shaft, said structure comprising an arm having a swivel connection with and extending laterally from one end of said shaft, a collar carried by said crank structure and formed to include a portion with which said arm is telescopically joined, said connection serving to automatically compensate for irregularities in the axial alinement of said crank structure and shaft.

4. In mechanism of the class described, the combination with a crank structure of an engine, a coöperative driving unit actuated by said structure, said unit comprising a shaft located in axial alinement with the rotative center of said crank structure, of a driving connection between said crank structure and shaft, comprising a collar member loosely carried by said crank structure, a drive arm projecting from said shaft and having its outer end telescopically joined with said collar member, and a disk and socket union between the inner end of said arm and shaft, said connection serving to automatically adapt itself to irregularities in the relative axial alinement of said crank structure and shaft.

5. In mechanism of the class described, the combination with the bed frame of an engine, a crank structure rotatably supported upon said frame and including a crank pin having oil ports formed therein, of a lubricating unit positioned upon said bed frame, said unit comprising an actuating shaft having an oil passageway formed longitudinally therein, a driving connection between said crank pin and said shaft, said connection having an oil port extending therethrough which is positioned to establish communication between the passageway of said shaft and the ports of said crank pin, and an oil pump actuated by said shaft and capable of transmitting oil to the passageway of said shaft so that the oil will be forced through the communicating ports of said connection and crank pin and delivered to the wear receiving surfaces of said pin.

6. In mechanism of the class described, the combination with the crank structure of an engine, of a lubricating mechanism including an actuating shaft having an oil passageway formed longitudinally therein, a centrally bored driving connection between said crank pin and said shaft, and an oil pump actuated by said shaft and capable of delivering oil to the longitudinal passageway of said shaft, whereby said oil will be delivered by centrifugal force through said connection and to the wear receiving surfaces of said crank structure.

7. In lubricating mechanism of the class described, a crank pin structure, a lubricating unit including an actuating shaft, a connection between said shaft and said structure, an oil pump, eccentric mechanism carried by said shaft for operating said pump, and a conduit extending from said pump through said shaft and connection and capable of delivering oil to the wear receiving surfaces of said structure.

8. In mechanism of the character described, in combination with the rotary crank structure of an engine, a lubricating unit including an operating shaft, means whereby said shaft will rotate in unison with said crank structure, an oil pump, a connection between said shaft and pump for operating the latter, and a reciprocatory indicator member operated by said shaft, the motion of said member being proportioned to constitute a correct reduction of the stroke of the engine's piston.

9. In mechanism of the character described, the combination with the crank structure of an engine of a lubricating unit stationarily positioned with respect to said engine, an operating shaft forming a part of said unit, a driving connection between said crank structure and shaft for rotating the latter, a slidable indicator member in said unit, means actuated by said shaft for reciprocating said member a distance proportioned to the stroke of the engine's piston, and a lubricating pump operated from said shaft.

10. In mechanism of the character described, the combination with the crank structure of an engine, of an oil pumping mechanism, a slidable indicator member, and an actuating element common to said mechanism and member, said element deriving its motion from said crank structure.

11. In mechanism of the character described, the combination with the crank structure of an engine, of a coöperative driving unit actuated by said structure, said unit comprising a shaft located in axial alinement with the rotative center of said crank structure, of a driving connection between said crank structure and shaft, comprising a collar member loosely carried by said crank structure, a drive arm projecting from said shaft and having its outer end telescopically joined with said collar member, a disk and socket union between the inner end of said arm and said shaft, said connection serving to automatically adapt itself to irregularities in the relative axial alinement of said crank structure and shaft, an eccentric driven by said shaft, a slidable indicator member, and a lever connected with said eccentric and with said member for the purpose of reciprocating the latter a distance proportioned to the stroke of the engine's piston.

In testimony whereof I affix my signature.

MARTIN A. THIEL.